United States Patent
Watanabe et al.

(10) Patent No.: US 7,813,855 B2
(45) Date of Patent: Oct. 12, 2010

(54) PARKING ASSIST SYSTEM

(75) Inventors: Kazuya Watanabe, Anjo (JP); Jun Kadowaki, Anjo (JP); Yu Tanaka, Aichi-gun (JP)

(73) Assignee: Aisin Seiki Kabushiki Kaisha, Aichi (JP)

( * ) Notice: Subject to any disclaimer, the term of this patent is extended or adjusted under 35 U.S.C. 154(b) by 0 days.

(21) Appl. No.: 12/531,400

(22) PCT Filed: Apr. 11, 2008

(86) PCT No.: PCT/JP2008/057140

§ 371 (c)(1),
(2), (4) Date: Sep. 15, 2009

(87) PCT Pub. No.: WO2008/129958

PCT Pub. Date: Oct. 30, 2008

(65) Prior Publication Data

US 2010/0106372 A1    Apr. 29, 2010

(30) Foreign Application Priority Data

Apr. 18, 2007    (JP) .............................. 2007-108961

(51) Int. Cl.
*B62D 6/00*    (2006.01)
*G05D 1/00*    (2006.01)
*G05D 1/12*    (2006.01)
*G05D 3/00*    (2006.01)
*G01C 21/00*    (2006.01)

(52) U.S. Cl. ...................... 701/41; 180/204; 340/932.2; 701/28; 701/42; 701/48; 701/201; 701/205; 348/119

(58) Field of Classification Search ............... 340/932.2, 340/933–943; 180/199–204, 6.2–6.7; 280/761
See application file for complete search history.

(56) References Cited

U.S. PATENT DOCUMENTS 6,424,895 B1 *    7/2002    Shimizu et al. ............... 701/41

(Continued)

FOREIGN PATENT DOCUMENTS

EP    1 491 425 A2    12/2004

(Continued)

OTHER PUBLICATIONS

International Search Report of PCT/JP2008/057140 dated May 13, 2008.

(Continued)

*Primary Examiner*—Jack Keith
*Assistant Examiner*—Jonathan M Dager
(74) *Attorney, Agent, or Firm*—Sughrue Mion, PLLC

(57) ABSTRACT

A parking assist system for guiding a vehicle under automatic steering control from a predetermined step position via a turning-direction switching position to a parking target position. With this parking assist system, based upon an operation of a steering wheel by a driver at the predetermined stop position, a parking mode and a parking target position corresponding to that parking mode are determined. And, regardless of the amount of the operation of the steering wheel given at the time of the determination of the parking mode, the vehicle is guided with a correction such that a deflection angle of the vehicle relative to the parking target position may be a predetermined deflection angle, at a corrected switching position nearby the switching position.

18 Claims, 10 Drawing Sheets

U.S. PATENT DOCUMENTS

| | | | |
|---|---|---|---|
| 6,483,442 B2 * | 11/2002 | Shimizu et al. | 340/932.2 |
| 6,487,481 B2 * | 11/2002 | Tanaka et al. | 701/41 |
| 6,704,653 B2 * | 3/2004 | Kuriya et al. | 701/301 |
| 7,375,651 B2 * | 5/2008 | Shimazaki et al. | 340/932.2 |
| 7,599,771 B2 * | 10/2009 | Mizusawa | 701/36 |
| 7,706,944 B2 * | 4/2010 | Tanaka et al. | 701/41 |
| 2001/0026317 A1 * | 10/2001 | Kakinami et al. | 348/148 |
| 2002/0005779 A1 * | 1/2002 | Ishii et al. | 340/436 |
| 2002/0041239 A1 * | 4/2002 | Shimizu et al. | 340/932.2 |
| 2002/0123829 A1 * | 9/2002 | Kuriya et al. | 701/1 |
| 2004/0254720 A1 * | 12/2004 | Tanaka et al. | 701/200 |
| 2004/0260439 A1 * | 12/2004 | Endo et al. | 701/36 |
| 2005/0049767 A1 * | 3/2005 | Endo et al. | 701/36 |

FOREIGN PATENT DOCUMENTS

| | | |
|---|---|---|
| EP | 1 491 430 A2 | 12/2004 |
| JP | 2001-18821 A | 1/2001 |
| JP | 2003-341543 A | 12/2003 |
| JP | 2004-345496 A | 12/2004 |

OTHER PUBLICATIONS

Translation of the International Preliminary Report on Patentability, Nov. 19, 2009 (5 pages).

* cited by examiner (a)

(b)

PARKING ASSIST SYSTEM

TECHNICAL FIELD

The present invention relates to a parking assist system for assisting a driving operation for parking a vehicle.

BACKGROUND ART

As an example of parking assist system described above, an automatic steering control apparatus for a vehicle is known from Patent Document 1 identified below. This automatic steering control apparatus utilizes a power steering system and allows a parking operation using only an accelerator and a brake. The power steering system includes a switchover unit and a rotation control unit for rotating the steering wheel by a steering operation under stopped condition (so-called "zero-speed steering"). In the case of garage parking, the vehicle travels forward from a start position, with turning, and then upon passing a turning-direction switching position, the vehicle travels in reverse and is guided to a target position. Prior to initiation of its movement with turning, the vehicle is set with a necessary steering amount by a zero-speed steering, and then moves to a next position. Upon making stop at this position, the vehicle is set with a necessary steering amount again by means of a zero-speed steering operation. Patent Document 1: JP2003-341543 A (paragraphs 6, 10, 11, 18-26, etc.)

With the automatic steering apparatus or parking assist system disclosed in the above-described Patent Document 1, trouble for the driver in parking can be alleviated. However, the zero-speed steering operation using a power steering system is often problematic. For the automated steering, the power steering system is driven by an actuator (e.g. a motor). In the stopped condition, there is significant static frictional coefficient between the road surface and the wheels (tires), so that the a large torque is required by the actuator for driving the power steering system. Namely, the operation requires an actuator capable of much higher torque than that required by the normal power assisting function of the power steering system. This is undesirable as it leads to cost increase.

As a solution to this problem, it is conceivable to effect the automatic steering operation while the vehicle is in movement. In this case, no large torque is required for the power steering system. However, if an error occurs in the zero-speed steering operation by the driver, this error may lead to an error in the course of parking assistance.

The present invention has been made in view of the above-described situation. Its principal object is to provide a parking assist system capable of guiding a vehicle to a predetermined position irrespectively of a steering amount given prior to movement of the vehicle when the vehicle is guided with turning to the predetermined position under control of automatic steering, with the given steering amount.

For accomplishing the above-noted object, a parking assist system for assisting parking of a vehicle relating to the present invention, the system comprises:

a parking target position setting section for temporarily setting, at a predetermined stop position, a parking target position for the vehicle for each one of a plurality of parking modes;

a parking mode determining section for determining, after the setting of the parking target position and based upon an amount of steering operation effected by a driver, a parking mode and the parking target position corresponding to the parking mode;

a guiding section for guiding, by automatic steering control, the vehicle from the predetermined stop position to the parking target position along a guiding path including at least one turning-direction switching position; and a correcting section for effecting such a correction that a deflection angle of the vehicle relative to the parking target position is corrected to a predetermined deflection angle at a corrected turning-direction switching position nearby said turning-direction switching position, regardless of the amount of steering operation effected prior to determination of the parking mode, the correcting section causing said guiding section to guide the vehicle to the parking target position, with the correction.

With the above-described characterizing feature, regardless of the amount of steering operation effected prior to movement of the vehicle, the vehicle is guided to the corrected turning-direction switching position nearby the turning point, under the automatic steering control. Further, as the correction is made such the deflection angle of the vehicle is corrected to the predetermined deflection angle at this corrected turning-direction switching position, when the vehicle moves from this corrected turning-direction switching position, the vehicle can follow a path parallel with the path initiating from the turning-direction switching position before the correction. As the corrected turning-direction switching position is nearby the original turning-direction switching position, it is possible to guide the vehicle to the parking target position with minimum amount of deviation.

In this way, with the inventive characterizing feature, it is possible to provide a parking assist system enabling guiding to a parking target position, regardless of a given amount of steering.

According to a further feature of the parking assist system of the invention, said correcting section causes said guiding section to guide the vehicle, with said corrected turning-direction switching position being a position of a same moving distance from the predetermined stop position as a moving distance from the predetermined stop portion to the turning-direction switching position.

With this characterizing feature, the total moving amount of the vehicle is maintained constant, so that there can be provided a preferred parking assistance according to the initially set guiding path.

Preferably, according to a further characterizing feature of the parking assist system, said guiding section effects a fixed steering control for guiding the vehicle with fixing the steering to a predetermined steering amount and a steering-back control for returning the steering amount to a neutral position at said turning-direction switching position; and when the amount of steering operation provided at the time of determination of the parking mode does not agree to said predetermined steering amount, said correcting section effects a correcting control for either increasing or decreasing the amount of steering operation in the course of guidance from said predetermined stop position to the turning-direction switching position, so as to render the steering amount equal to the predetermined steering amount.

As the parking assist system effects the guidance from the predetermined position to the turning-direction switching position, with fixing the steering, stable guidance can be provided. Further, if the correcting control for increasing or decreasing the steering amount in the course of this guidance, the steering amount can be returned to the predetermined steering amount speedily.

In the above, preferably, said correcting control is effected prior to said fixed steering control. With this, the steering amount can be returned to the predetermined steering amount speedily, and thereafter, the vehicle can be guided in a favorable manner by the stable fixed steering control.

Preferably, according to a further characterizing feature of the parking assist system of the invention, after said fixed steering control, the steering-back control for returning the steering amount to a neutral position at said turning-direction switching position is effected.

With the above, the steering amount at the corrected turning-direction switching position nearby the initial switching position prior to the correction, is returned to the neutral position. Therefore, the turning direction can be switched over in an advantageous manner.

Preferably, according to a further characterizing feature of the parking assist system of the invention, the steering amount per unit time in said correcting control is substantially equal to the steering amount per unit time in the steering-back control to the initial turning-direction switching position prior to the correction.

When the correcting control is effected during the guidance from the predetermined stop position to the turning-direction switching position, there arises need for the guiding section to guide the vehicle with switching the turning-direction switching position to the corrected switching position to make transition from the fixed steering control to the steering-back control. The corrected switching position needs to be nearby the initial switching position and the deflection angle of the vehicle relative to the parking target position needs to be the predetermined deflection angle. With execution of the correcting control, the guiding section needs to e.g. change the timing of transition from the fixed steering control to the steering-back control or change the moving distance of the vehicle from the predetermined stop position to the corrected switching position. In the course of this, if the steering amount per unit time in the correcting control is rendered substantially equal to the operation amount in unit time in the steering-back control to the corrected switching position, the required calculation can be easy. That is, it become advantageously possible to reduce the operation time or operation load for the guiding section.

According to a further characterizing feature of the parking assist system of the present invention, said parking mode determining section determines that the parking mode is a right-hand or left-hand garage parking if the steering was operated to the left or the right by an amount equal to or greater than a predetermined amount in the vicinity of the predetermined stop position; and said guiding path includes a forward guiding path including a turn in a first turning direction from said predetermined stop position to said switching position and a reverse guiding path including a turn in a second turning direction from said switching position to said parking target position.

In the case of a garage parking operation, in general, the vehicle is first driven obliquely forward with a turn in the opposite direction away from the parking target position. After the vehicle reaches the switching position, the vehicle is driven in reverse with a turn toward the parking target position. The first turn is the turn in the first turning direction and the second turn is the turn in the second turning direction. The mode of parking where the vehicle is first driven forward obliquely left-hand from the predetermined stop position is the right-hand garage parking. The mode of parking where the vehicle is first driven forward obliquely right-hand from the predetermined stop position is the left-hand garage parking. Therefore, based upon the amount of steering and the direction of steering, the parking mode determining section can effectively determine the direction of garage parking and then can determined the parking target position based upon the result of this determination.

The steering operation utilized for the above determination is in good agreement with the steering direction in moving forward the vehicle from the vicinity of the predetermined stop position. Therefore, the steering operation for the determination of parking mode can be effectively utilized for the forward guiding, so that it becomes possible to reduce the moving distance to the turning-direction switching position where reverse movement is started. Further, as the steering operation for the parking mode determination is same as the operation required for manual garage parking, the driver can effect input for commanding a parking mode in a natural smooth manner.

According to the above-described characterizing features, it has become possible to provide a parking assist system capable of guiding a vehicle to a predetermined position irrespectively of a given steering amount for providing highly efficient parking assistance.

BEST MODE OF EMBODYING THE INVENTION

Figure 1:
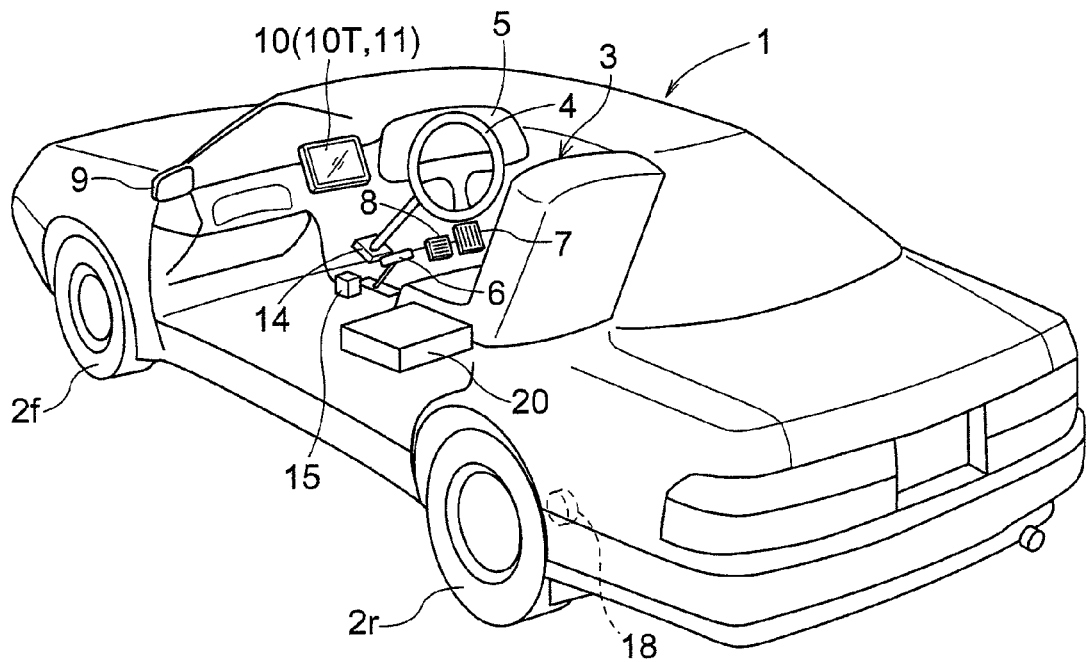
FIG. 1 a perspective view showing a driver's seat made visible by cutting out a portion of a vehicle.
Figure 2:
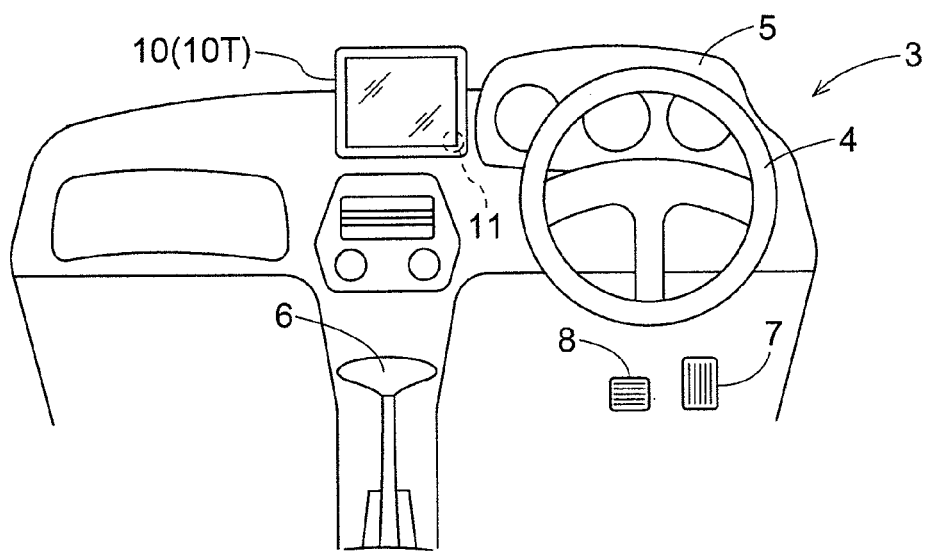
FIG. 2 an explanatory view of a front side of the driver's seat.
Figure 3:
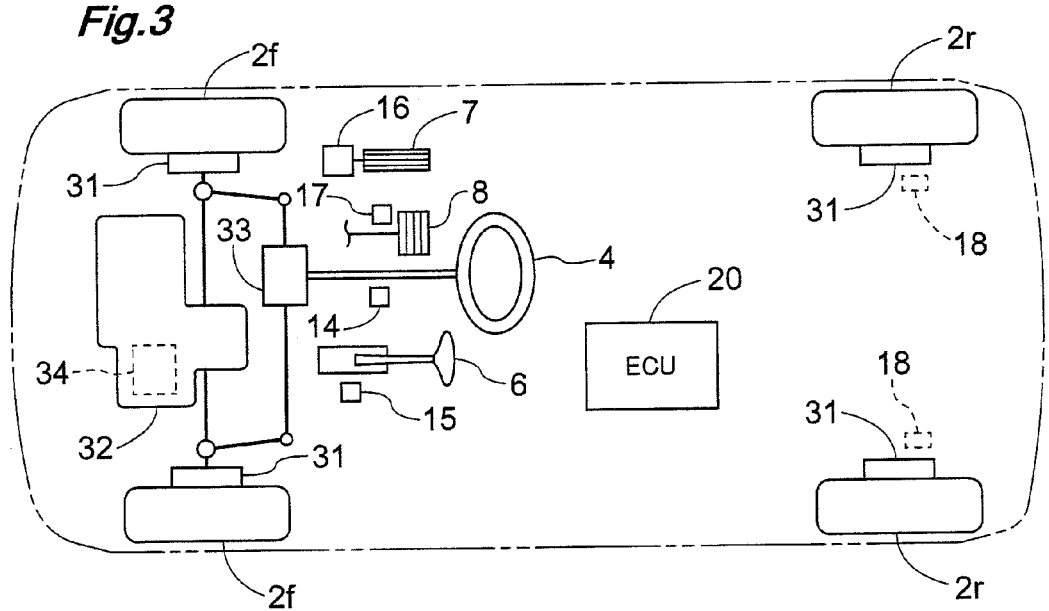
FIG. 3 a plan view schematically showing respective components of the vehicle.

Next, an embodiment of the present invention will be explained with reference to the accompanying drawings. FIGS. 1-3 show the basic construction of a vehicle 1 mounting a parking assist system for automatic steering relating to the present invention.

A steering wheel 4 provided at a driver's seat 3 is operably coupled with a power steering unit 33 for driving steering by transmitting a rotational operating force to front wheels 2f. At a front section of the vehicle, there are mounted an engine 32, a speed changing mechanism 34 having a torque converter, a CVT, etc. for speed-changing power from the engine 32 and transmitting the speed-changed power to the front wheels 2f. In the vicinity of the driver's seat 3, there are arranged in juxtaposition, an accelerator pedal 7 as an acceleration operating means for controlling traveling speed and a brake pedal 8 for activating braking devices 31 for the front wheels 2f and rear wheels 2r so as to apply braking forces to the front wheels 2f and the rear wheels 2r.

At an upper position on a console provided nearby the driver's seat 3, there is mounted a monitor 10 having a touch panel 10T on its display screen. This monitor 10 includes a speaker 11. Incidentally, the speaker 11 can alternatively be mounted within a panel 5 or a door. The monitor 10 is a liquid-crystal type monitor having backlight. Needless to say, this can be a plasma display type, a CRT type, etc, instead. The touch panel 10T can be a pressure-sensitive type or an electrostatic type and outputs a position touched by e.g. a finger as location data. In this embodiment, the monitor 10 employed is used also as a display device for a navigation system. In the instant embodiment, as will be detailed later, this touch panel 10T of the monitor 10 is used as an instruction inputting means for starting parking assistance. Therefore, if any other separate component such as a switch is provided as this instruction inputting means for starting parking assistance, the monitor 10 is not absolutely needed.

The operating line for the steering wheel 4 includes a steering sensor 14 for determining a direction and an amount of steering operation. The operating line for a shift lever 6 includes a shift position sensor 15 for determining a shift position. The operating line for the accelerator peal 7 includes an accelerator sensor 16 for determining an operation amount. The operating line for the brake pedal 8 includes a brake sensor 17 for detecting e.g. presence/absence of braking operation.

Further, as a moving distance sensor, there is provided a rotation sensor 18 for determining a rotational amount of at least either one of front wheels 2f or rear wheels 2r. Needless to say, the moving amount of the vehicle 1 can be determined in a speed changing mechanism 34, based upon a rotational amount of a driving line. Further, the vehicle 1 mounts an ECU (electronic control unit) for executing traveling control including parking assistance.

Figure 4:
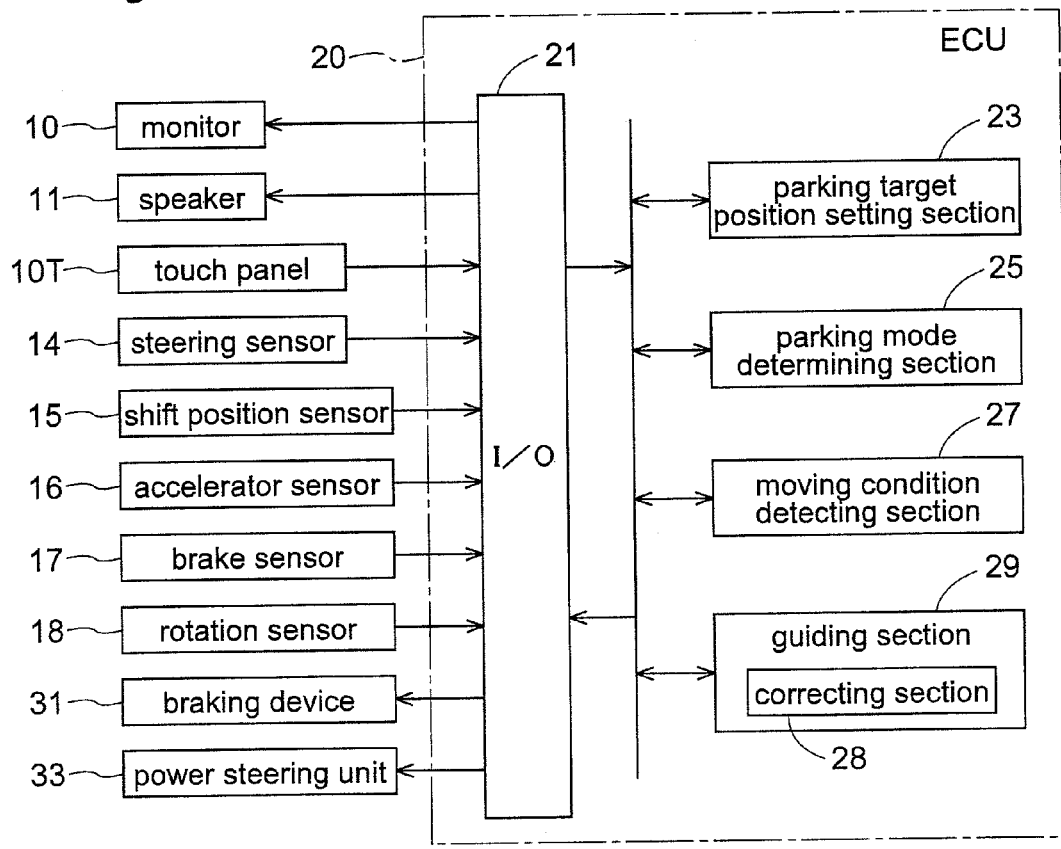
FIG. 4 a block diagram schematically showing construction of a parking assist system according to the present invention.

FIG. 4 is a block diagram schematically showing the construction of the parking assist system of the present invention. The parking assist system of the invention comprises the ECU 20 as the core component thereof. The ECU 20 includes an input/output interface (I/O) 21 for effecting inputs/outputs of information and includes also a microprocessor for processing information from this input/output interface 21. Needless to say, the input/output interface 21 can be partially or entirely incorporated within the microprocessor. The ECU 20 comprises an electronic circuitry having the microprocessor as the core component thereof.

As shown in FIG. 4, the parking assist system includes an inputting line for inputting information from the touch panel 10T, the steering sensor 14, the shift position sensor 15, the accelerator sensor 16, the brake sensor 17, the rotation sensor 18, etc. The parking assist system also includes an outputting line for outputting control signals to the monitor 10, the speaker 11, the brake devices 31, and the power steering unit 33. In the automatic steering in the instant embodiment, in an operation of the speed changing mechanism, only the timing of the shift change is informed and the actual shift changing operation is left up to the driver's operation. Further, in case the monitor 10 is not provided in such a case where no navigation system is mounted, informing is done only by sound through the speaker 11. Further, in case no monitor 10 is mounted and no touch panel 10T is provided either, information from other instruction inputting means such as switches as described above, will be inputted to the inputting line.

The ECU 20 includes various functional sections connected to the input/output interface 21. These connections are done via data buses, address buses, control busses, a memory in the microprocessor, etc. For the purpose of simplicity of explanation, however, the detailed descriptions and illustrations thereof are omitted. As shown in FIG. 4, the ECU 20 includes a parking target position setting section 23, a parking mode determining section 25, a moving condition detecting section 27 and a guiding section 29. The guiding section 29 includes a correcting section 29. In this embodiment, these respective functional sections are realized in cooperation between the microprocessor and a program. However, these can also be realized by e.g. hardware using logic circuits.

Next, with reference also to the flowcharts shown in FIG. 5 and FIG. 6, the procedure of parking assistance by the parking assist system of the present invention will be described.

A driver who is to receive the parking assistance stops the vehicle 1 at a predetermined stop position relative to a place where the driver desires to park the vehicle 1 (i.e. "parking target position"). Then, at this predetermined position, the driver gives a start instruction for starting the parking assistance to the ECU 20. As an example, the driver gives this parking assistance start instruction via an instruction inputting means such as the touch panel 10T. The ECU 20 confirms this start instruction received via the input/output interface 21 (#1).

Figure 7:
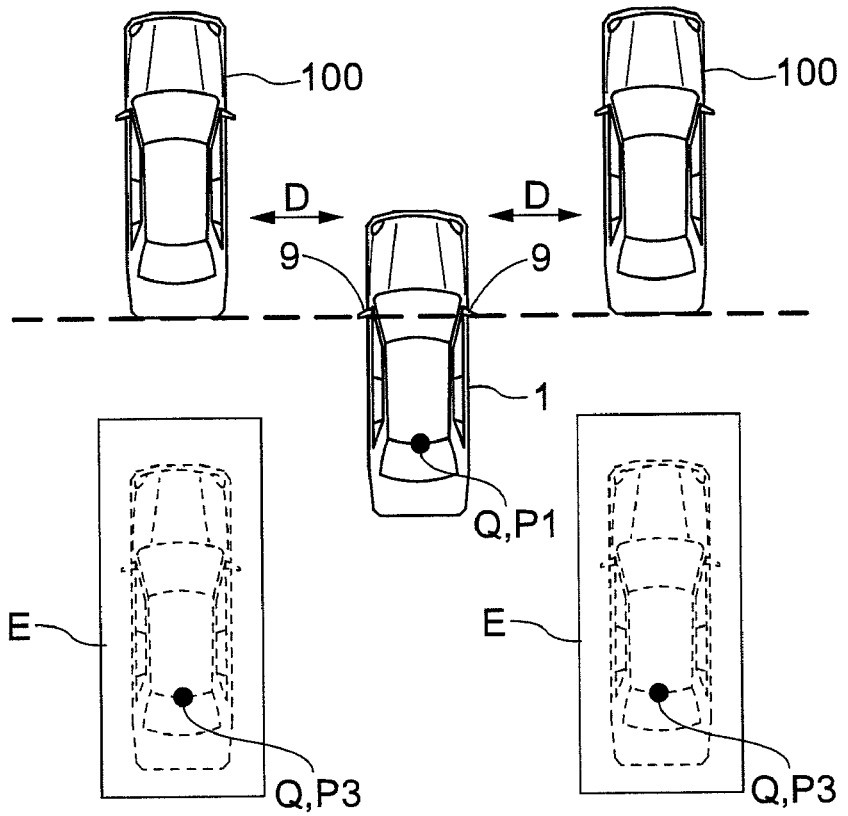
FIG. 7 an explanatory view showing a predetermined stop position at the time of start of parking assistance for parallel parking.
Figure 8:
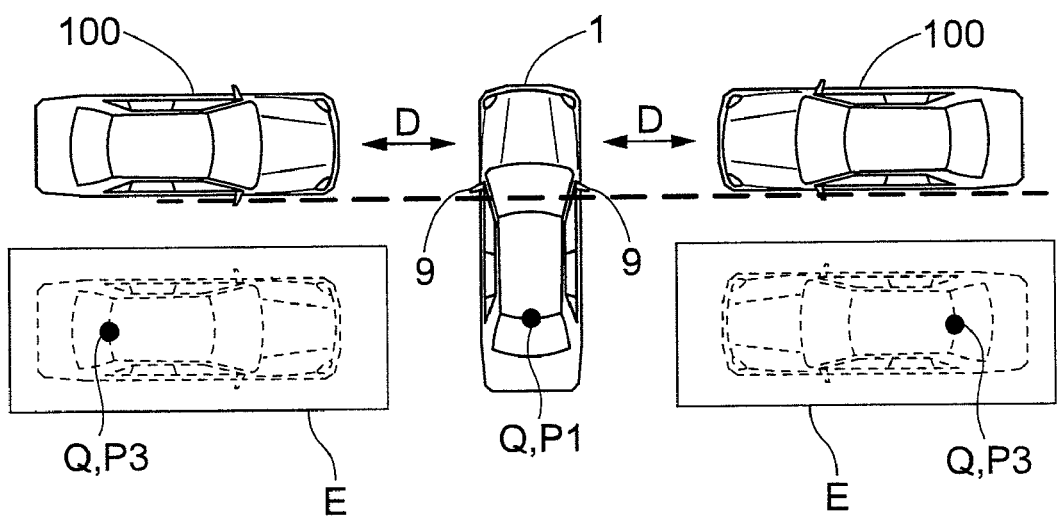
FIG. 8 an explanatory view showing a predetermined stop position at the time of start of parking assistance for garage parking.

FIGS. 7 and 8 are explanatory views showing the predetermined positions. The driver stops the vehicle 1 at a position where a terminal end of the parking target position such as a parked vehicle 100 parked forwardly or adjacent the parking target position can be designated. More particularly, in the case of a parallel parking, as shown in FIG. 7, the driver steps the vehicle 1 at a position where door mirrors 9 of the vehicle 1 are in linear alignment with the terminal end of the parking target position in the transverse direction of the vehicle 1. Whereas, in the case of a garage parking, as shown in FIG. 8, the driver stops the vehicle 1 at a position where door mirrors 9 of the vehicle 1 are in linear alignment with the terminal end of the parking target position in the transverse direction of the vehicle 1. In these, the vehicle 1 is stopped at a position distant by a predetermined distance D from the parking target position in the transverse direction of the vehicle 1 Each of the above operations fixedly sets the relationship in the two-dimensional coordinates between the parking target position and the vehicle 1, assuming that the vehicle 1 is present on a horizontal plane.

As described above, the parking assistance start instruction is given at the predetermined stop position. Therefore, the parking target position setting section 23 can set the parking target, based upon a reference position Q of the vehicle 1. In this, the reference position Q is preferably the center of the axle of the rear wheels 2r.

In the case of a parallel parking, a parking target position P3 and a parking target area E are set, relative to the assistance start position (predetermined stop position) P1, as illustrated in FIG. 7. And, the guiding section 29 can set a guiding path along which the vehicle is driven forward from the assistance start position P1 to a reverse drive start position P2 and then with a turn, the vehicle is driven reverse from the reverse drive start position P2 to the parking target position P3. In the case of parallel parking, in the course of the reverse traveling path, there is included a turning direction switching position P4.

In the case of garage parking, the parking target position setting section 23 sets a parking target position P3 and a parking target area E, relative to the assistance start position (predetermined stop position) P1, as illustrated in FIG. 8. And, the guiding section 29 can set a guiding path along which the vehicle is driven forward with a turn from the assistance start position P1 to a reverse drive start position P2 and then with the opposite turn, the vehicle is driven reverse from the reverse drive start position P2 to the parking target position P3. In the case of garage parking, the reverse drive start position P2 becomes the turning direction switching position.

However, when the vehicle 1 has stopped at the predetermined stop position (assistance start position P1), no parking mode such as parallel parking, garage parking, has been determined yet. Therefore, when the vehicle 1 has stopped at the predetermined stop position and has been given parking assistance start instruction, the process temporarily sets all possible parking target positions P3 and all possible parking target areas E shown in FIG. 11 (FIG. 5, #2). That is, as the parking target positions P3, there are set a parking target position p31 in the case of the right-hand garage parking of the vehicle 1, a parking target position p32 in the case of the left-hand garage parking, a parking target position p33 in the case of the left-hand parallel parking, and a parking target position p34 in the case of the right-hand parallel parking. Incidentally, the moving paths of the vehicle 1 shown by the solid-line arrows in FIGS. 9 and 10 represent only the concepts, not showing the exact moving paths of the reference point Q of the vehicle 1.

Figure 9:
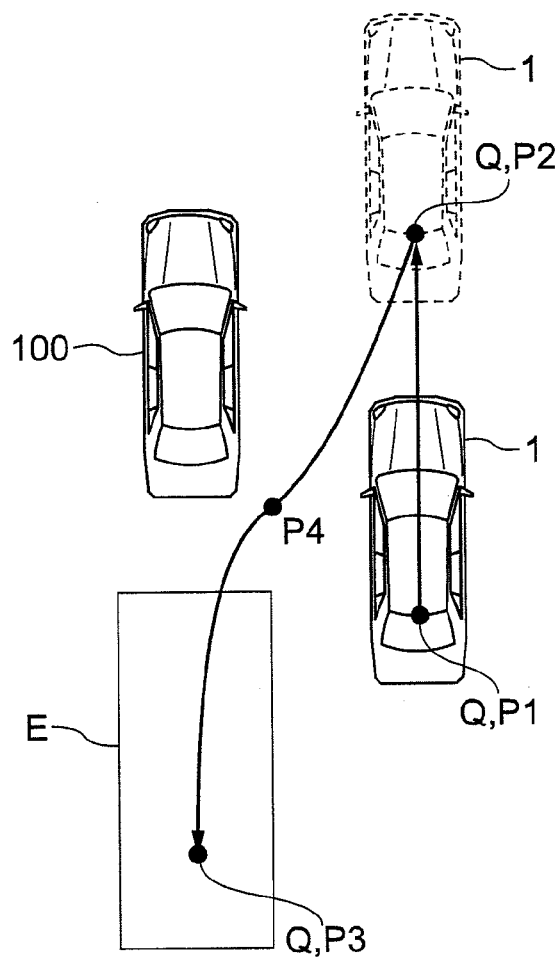
FIG. 9 an explanatory view showing a guiding path at the time of parallel parking.
Figure 10:
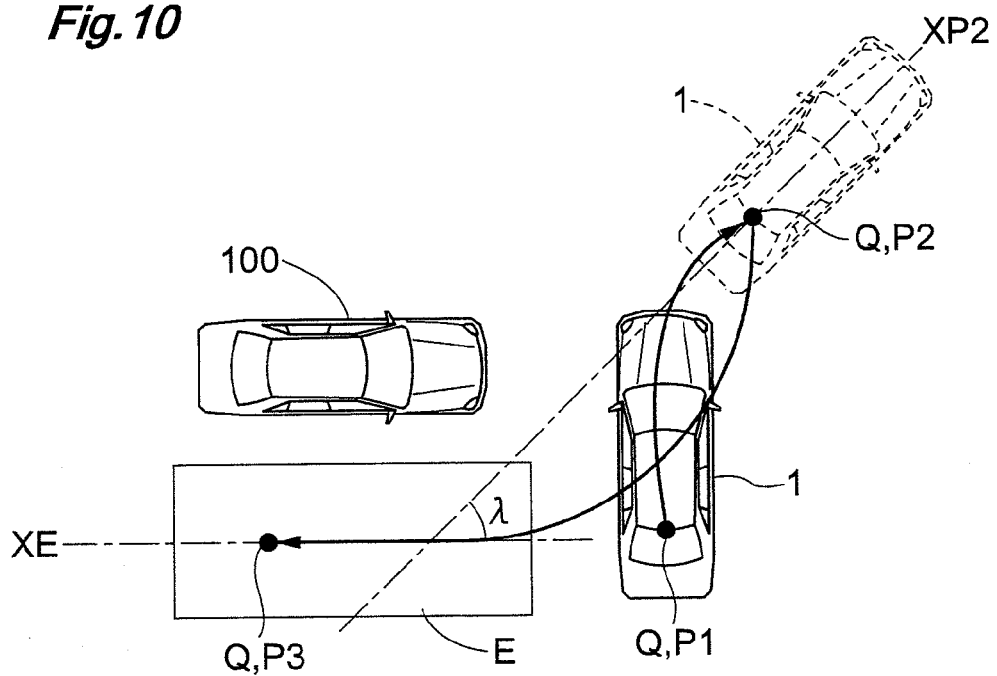
FIG. 10 an explanatory view showing a guiding path at the time of garage parking.
Figure 11:
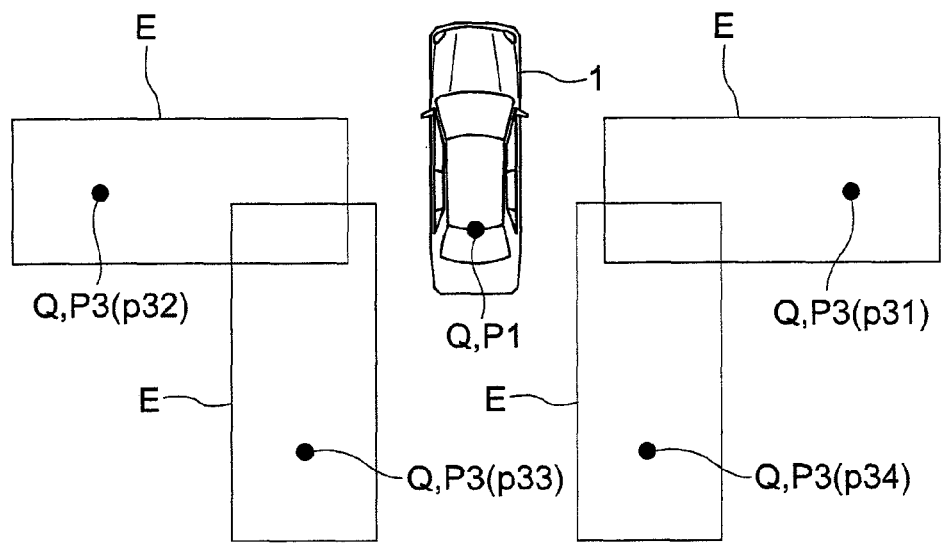
FIG. 11 an explanatory view showing a temporary set position of parking target position.

Referring now back to FIGS. 9 and 10, in the case of parallel parking, the vehicle 1 is driven straight forward from the assistance start position P1. On the other hand, in the case of garage parking, the vehicle 1 is driven forward with a turn. As show in FIG. 10, in the case of the left-hand garage parking, the vehicle is driven forward, with a turn toward the right forward side. Though not shown, in the case of right-hand garage parking, the vehicle is driven forward with a turn toward the left forward side. In these ways, the movements of the assistance start position P differ according to the parking modes.

Now, the parking mode determining section 25 prompts an operation of the steering wheel 4 by the driver via the input-output interface 21 and the speaker 11. Specifically, the parking mode determining section 25 informs, by voice message, the driver to operate the steering wheel 4 to the left in the case of the right-hand garage parking and informs the driver to operate the steering wheel 4 to the right in the case of the left-hand garage parking. In this, the operating amount of steering wheel 4 is also informed, such as, the maximum steering angle to the left or the right, or quantitatively, in specific numerical values, such as one rotation, or two rotations of the steering wheel 4, etc. On the other hand, in the case of parallel parking, the parking mode determining section 25 informs, by a voice message, the drive not to operate the steering wheel 4 at all.

The parking mode determining section 25 determines whether the given operational amount of the steering wheel 4 exceeds a predetermined operational amount A or not (FIG. 5, #3), thus determining whether the parking mode is parallel parking or garage parking. More particularly, if the operational amount of the steering wheel 4 is greater than the predetermined operational amount A, it is determined that the parking mode is a garage parking. Whereas, if the operational amount of the steering wheel 4 is below the predetermined operational amount A, it is determined that the parking mode is parallel parking, so that the process moves to a parallel parking control subroutine (#80). The details of this subroutine shown in FIG. 6 will be discussed later.

Further, if the given operational amount of the steering wheel 4 is greater than the predetermined operational amount A, then, the parking mode determining section 25 further determines whether the operational direction is to the right or left (#4) and determines whether the parking mode is right-hand parallel parking or left-hand parallel parking. More particularly, if the operational direction is found to the left, then, it is determined that the parking mode is right-hand parallel paring (#51). Whereas, if the operational direction is found to the right, then, it is determined that the parking mode is left-hand parallel paring (#61).

Incidentally, the timing of this determination may be upon lapse of a predetermined period after the driver has given the parking assistance start or may be when the driver loosens stepping-on force on the brake pedal 7 and the vehicle 1 is started with "creeping" movement. Or the timing may be both of these. For instance, if the driver gives the parking assistance start instruction and then immediately starts the vehicle 1, the parking mode can be determined as parallel parking, regardless of lapse of any period.

After the temporary setting of the parking target positions, the parking mode determining section 23 determines one particular parking mode, based upon the operation of the steering wheel 4 after the instruction of the parking assistance start. This "operation of steering wheel 4" includes also a case where the steering angle was given prior to the input of parking assistance. For instance, it includes such a case where after the driver stops the vehicle 1 at the predetermined stop position (assistance start position P1), the driver operates the steering wheel 4 and then gives the parking assistance start instruction. The parking mode determining section 23 determines the parking mode, based upon the operational amount (steering angle) of the steering wheel 4 either upon lapse of a predetermined period or at the time of start of the vehicle 1, after giving the parking assistance start instruction.

If the operation of the steering wheel 4 for determination of parking mode, as described above, is effected by mans of a steering operation while the vehicle 1 is stopped, that is, by means of a zero-speed steering operation, the load for the guiding section 29 for e.g. calculation of the guiding path can be reduced, advantageously. However, the operation of the steering wheel 4 is not limited to the so-called zero-speed steering operation described above. That is, it is not absolutely needed that the determination of parking mode be effected while the vehicle 1 is completely stopped at the predetermined stop position. Instead, the determination may be made with slight movement of the vehicle or may be made at the stop position, but after slight movement. Namely, the determination of parking mode can be done in the vicinity of the predetermined stop position.

In this way, according to the present invention, the steering wheel 4 gripped by the driver during driving can be advantageously used as the "instruction inputting means" for setting the parking mode, without needing to use any special, separately provided inputting means such as the touch panel 10T. Further, since the operational amount of the steering wheel 4 can be informed quantitatively as a numerical value as described above, this can be set simultaneously as the initial steering angle for the movement from the assistance start position P1.

In the present embodiment, the parking assistance from the assistance start position P1 to the parking target position P3 is effected by automatic steering control. In this automatic steering, the power steering unit 33 is driven by an actuator (e.g. a motor). While the vehicle 1 is still, there exists a significant static frictional coefficient between the front wheels 2f acting as the steerable wheels in the present embodiment and the road surface, so that the driving of the power steering unit 33 by the actuator is difficult. Therefore, it is needed to drive the unit for changing the steering angle from the neutral position to the steering angle while the vehicle 1 is in movement. This method, however, requires an excess amount of movement until the necessary steering angle is reached, thus leading to increase of the moving distance for effecting the parking assistance. For this reason, a large space will be required for the parking assistance, so that the parking assistance may become unusable in a small parking lot, thus impairing the convenience. According to the present embodiment; however, these problems can be solved since the initial steering angle for the movement from the assistance start position P1 is set by the driver.

Here, supposing that the parking mode determining section 25 has determined that the parking mode is garage parking, the guiding section 29 starts guidance to the parking target position P3. First of all, forward guiding to the reverse start position P2 is effected (FIG. 5, #51, #61). In the course of movement of the vehicle 1 from the assistance start position P1 to the reverse start position P2, calculation is effected, with the provision of the reference point Q being in constant motion.

The position information of the vehicle 1 during the movement (moving condition) is detected by a moving condition detecting section 27. The moving condition detecting section 27 detects the moving condition of the vehicle, based on inputs from the steering sensor 14, the rotation sensor 18, the accelerator sensor 16, the shift position sensor 15, the brake sensor 17, etc. shown in FIG. 4. Therefore, the moving condition detecting section 27 can be constructed to incorporate these sensors therein. Further, as a further input to the moving condition detecting section 27, a yaw rate sensor (not shown) can be used, in addition to the above-described sensors.

Figure 12:
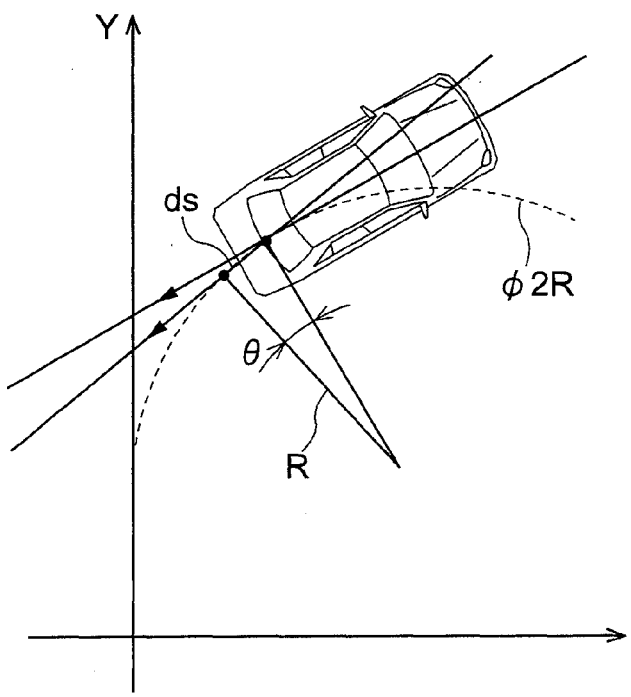
FIG. 12 a view for explaining a method of calculating the position of self vehicle.
Figure 12:
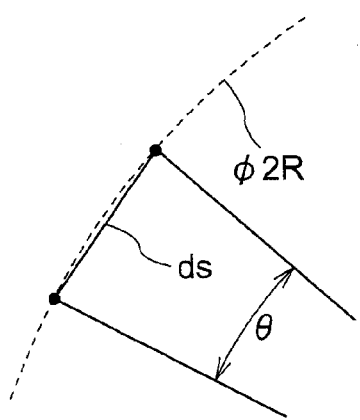

FIG. 12 shows an example of detection of position change (moving condition) of the vehicle 1, based upon the inputs from the steering sensor 14, the rotation sensor 18, etc. FIG. 12 shows a reverse movement of the vehicle 1 making a turn with a turning radius R. The broken line in the figure shows the path of the vehicle 1 turning with the turning radius R, i.e. an arc of 2R with a diameter of φ. FIG. 12 (*b*) is a partially enlarged view of FIG. 12 (*a*). The moving condition detecting section 27 detects the moving condition by mathematically integrating position changes (minimum moving distances) of the vehicle 1 for a minimum period, calculated from the turning radius R of the vehicle 1.

The mark (ds) shown in FIG. 12 and in formulae (1)-(3) below represent the minimal moving distance. This minimal moving distance is calculated, based on the input from the rotation sensor 18, for instance. Further, the turning radius of the vehicle 1 is calculated, based on the input from the steering sensor 14. The integration range (α) shown in formulae (1)-(3) represents the cumulative movement distance.

$$\theta = \int_0^\alpha \frac{1}{R} \cdot ds \tag{1}$$

$$X = \int_0^\alpha \sin\theta \cdot ds \tag{2}$$

$$Y = \int_0^\alpha \cos\theta \cdot ds \tag{3}$$

In case the parking mode is a garage parking, after the temporary setting of the parking target positions P3, the parking mode is determined, based upon the operation of the steering wheel 4 at the predetermined stop position (or its vicinity). More particularly, if the steering wheel is operated to the left by an amount greater than the predetermined operational amount A in the vicinity of the predetermined stop position (assistance start position P1), the parking mode determining section 25 determines that the parking mode is right-hand garage parking (FIG. 5, #51). Whereas, if the steering wheel is operated to the right by an amount greater than the predetermined operational amount A in the vicinity of the predetermined stop position (assistance start position P1), the parking mode determining section 25 determines that the parking mode is left-hand garage parking (FIG. 5, #61).

And, in the case of garage parking, the guidance is made from the predetermined stop position (assistance start position P1) to the parking target position P3 along a guiding path including at least one turning-direction switching position (reverse start position P2). This guiding path includes a forward guiding path including a turn in a first turning direction from the predetermined stop position (assistance start position P1) to the switching position (reverse start position P2) and a reverse guiding path including a turn in a second turning direction from the switching position (reverse start position P2) to the parking target position P3.

In the above, the radius of the turn in the first turning direction during the guidance is affected by the steering amount of the steering wheel 4 operated at the time of determination of the parking mode. Namely, there is possibility of an error being made in that driver's steering operation, so the guiding path of the parking guidance can be deviated.

However, according to the present embodiment, as will be detailed later, regardless of the given operational amount of the steering wheel 4, the vehicle 1 is guided such that the deflection angle (λ to be described later) of the vehicle 1 relative to the parking target position P3 may be a predetermined deflection angle λ, in the vicinity of the switching position (reverse start position P2). That is, irrespectively of the amount of error, if any, relative to the optimum operational amount of the steering wheel 4 at the assistance start position P1, the vehicle 1 is guided such that its deflection angle may be the predetermined deflection angle λ, in the vicinity of the reverse start position. More particularly, the correcting section 28 corrects the switching position (reverse start position P2) to a corrected switching position ("corrected reverse start position P2a, P2b" to be described later), in the vicinity of the initial (i.e. non-corrected) switching position.

In the above, the deflection angle λ refers to the angle of orientation of the vehicle 1 relative to the parking target position P3, as shown in FIG. 10. That is, the deflection angle λ refers to the angle formed between an axis EX in the fore/aft direction of the parking target area E and an axis EX2 in the fore/aft direction of the vehicle 1 at the reverse start position P2.

Figure 13:
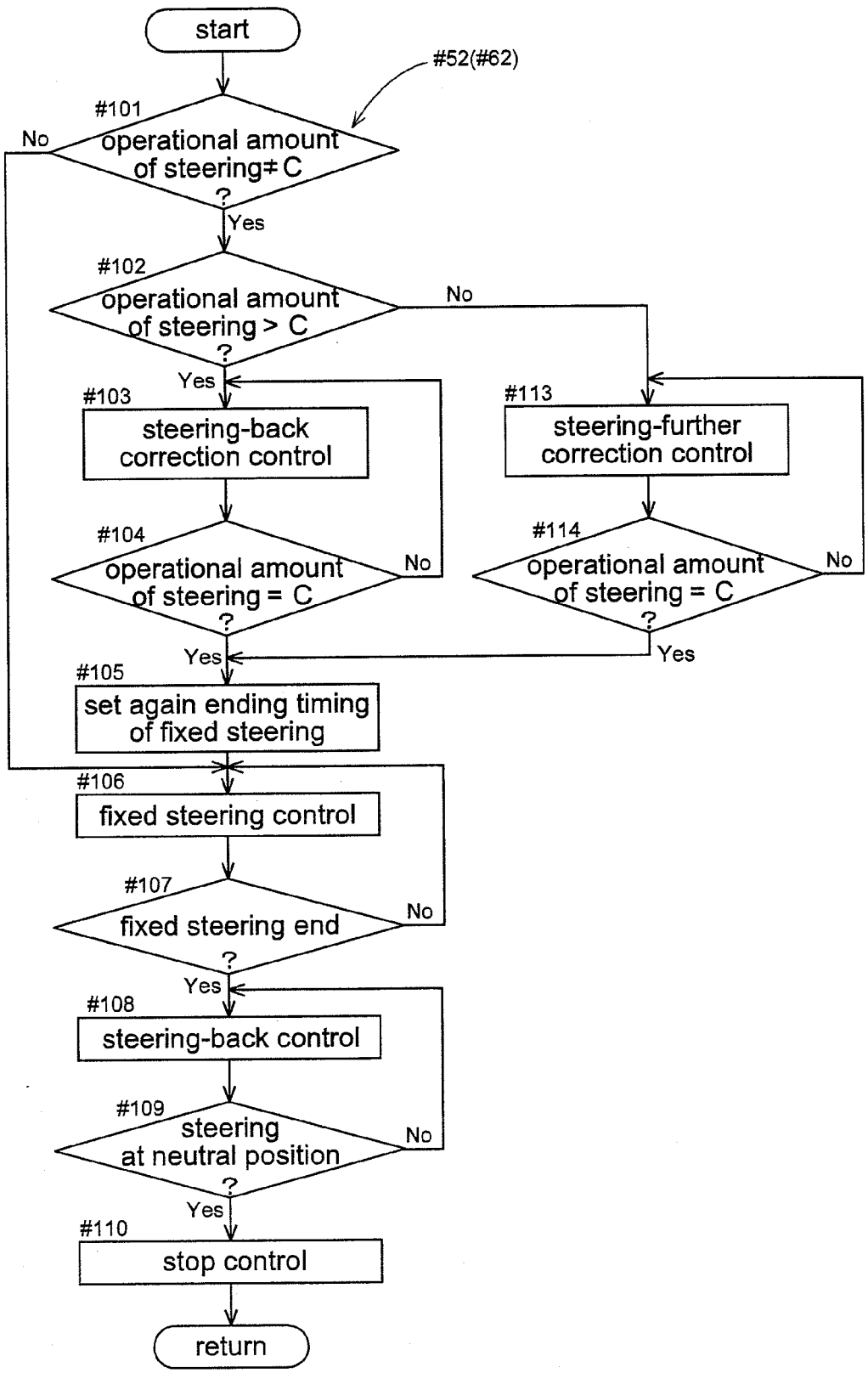
FIG. 13 a flowchart illustrating procedure of forward guiding at the time of garage parking with addition of correcting operation by a correcting section.

FIG. 13 shows a flowchart illustrating the procedure of forward guiding at the time of garage parking, with addition of such correcting operation by the correcting section 28. This corresponds to the subroutines at steps #52 and #62 in FIG. 5.

First, based upon the input from the steering sensor 14, the process determines whether the operational amount of the steering wheel 4 is in agreement with the predetermined operational amount C or not (#101). If it is in agreement, then, the guiding section 29 executes a fixed steering control for causing the vehicle to move forward with fixing this steering angle (#106). The fixed steering control is continued until the process determines completion of steering control (#107). Upon determination of completion of the fixed steering control, a steering-back control for returning the steering angle is executed (#108). This steering-back control is continued until the process determines that the steering wheel 4 has returned to its neutral position (#109). Upon return of the steering wheel 4 to the neutral position, the process executes a stop control (#110), whereby the vehicle 1 is stopped.

Figure 14:
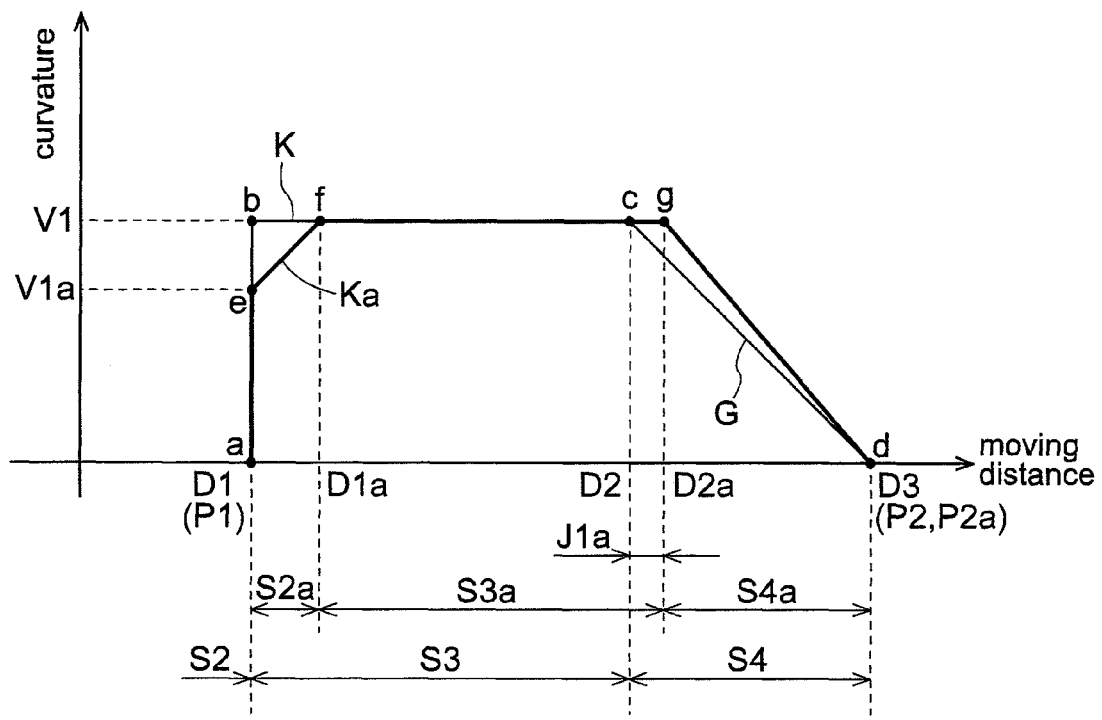
FIG. 14 a correlation diagram showing relationship between curvature and moving distance at the time of forward guiding in garage parking.

FIG. 14 shows a correlation diagram showing the relationship between the curvature and the moving distance at the time of forward guiding in the garage parking. As shown, at the assistance start position P1 (moving distance D1), a steering angle (a curvature) is set by a zero-speed steering operation (point a→b, section S2). Needless to say, in this case of the steering angle being set by a zero-speed steering operation, the section S2 indicative of the moving distance during the change of the steering angle (curvature) from point (a) to point (b) is substantially zero. In this, when the operational amount of the steering wheel 4 is the predetermined operational amount C, the curvature of turning at the time of forward guiding becomes V1 (point b). And, from the assistance start position P1 to the moving distance D2, this curvature V1 is maintained (point b→c, section S3). From the moving distance D2 to D3, the steering angle is returned, and upon arrival at the reverse start position P2 (moving distance D3), the curvature becomes zero (point c→d, section S4). That is, the steering wheel 4 is returned to the neutral position.

Referring now back to FIG. 13, if it is determined at step #101 that the operational amount of the steering wheel 4 is not in agreement with the predetermined operational amount C, then, the process determines the magnitude or amount of its excess/shortage (#102). If it is determined that the operational amount is less than the predetermined operational amount C, a steering-further correction control is executed (#113). This steering-further correction control is executed until the operational amount of the steering wheel 4 reaches the predetermined operational amount C (#114). Upon arrival of the operational amount of the steering wheel 4 at the predetermined operational amount C, then, the fixed steering control will be effected. But, prior to this, a fixed steering control completing timing is set again (#105).

Referring now back to FIG. 14, the above-mentioned steering-further correction control will be further explained. In case the operational amount of the steering wheel 4 is less than the predetermined operational amount C, the curvature is a curvature V1a which is less than the predetermined curvature (point a→b, section S2). That is to say, the operation of the steering wheel 4 was ended at point (e), before reaching point (b), in the section S2. Therefore, the correcting section 28 returns the curvature to curvature V1 by additionally operating the steering wheel 4, with moving the vehicle 1 forward (point e→f, section S2a). For this return, the steering-further, i.e. additional steering is effected at the same rate as the rate of change of the curvature at the time of the above-described steering-back control (#108). In other words, the steering-further correction control is effected with a slope of same absolute value as the slope G at the time of the steering-back control. Specifically, the slope at the time of the steering-further correction control from point (e) to point (f) has a same absolute value as the inclination G at the time of the steering-back control from point (c) to point (d). In terms of the operational amount of the steering wheel 4, the above means that the operational amounts per unit time are rendered equal to each other.

As shown in FIG. 14, during the section S2a required for the returning, the curvature changes with a transition Ka differs from the normal transition K. In this case, as the curvature V1 was reached with delay, in order to complete the required turn, the fixed steering needs to be maintained longer than the normal completion timing of fixed steering. Namely, the fixed steering period is prolonged by a section J1a from the moving distance D2 (point c) to the moving distance D2a (point g). With this, the fixed steering period becomes a section S3a (point f→g). And, from the moving distance D2a to the moving distance D3, the steering-back control is effected (point g→d, section S4a). As the moving distance D3 remains the same as the normal time, in correspondence with the delay in the start of retuning steering control, the rate of change of the curvature in the steering-back control is increased, namely, the slope is increased. Further, for the moving distance D3, the vehicle 1 will be located at the corrected reverse start position P2a in the vicinity of the reverse start position P2. The positional relationship between the reverse start position P2 and the corrected reverse start position P2a will be discussed later.

The ending timing of the fixed steering control described above is determined by obtaining a particular point (g) with which agreement is established in areas between a triangle (bef) and a triangle (cdg) in FIG. 14. With this, agreement is established between the normal curvature transition K and the curvature transition Ka at the time of correction (at the time of steering-further correction). That is, agreement is established between the area of a quadrangle (trapezoid) (abed) and the area of the polygon (aefgd). With agreement of the total change amounts of deflection angle, agreement is established between the deflection angle λ at the reverse start position P2 and the deflection angle λ at the corrected reverse start position P2a.

Figure 16:
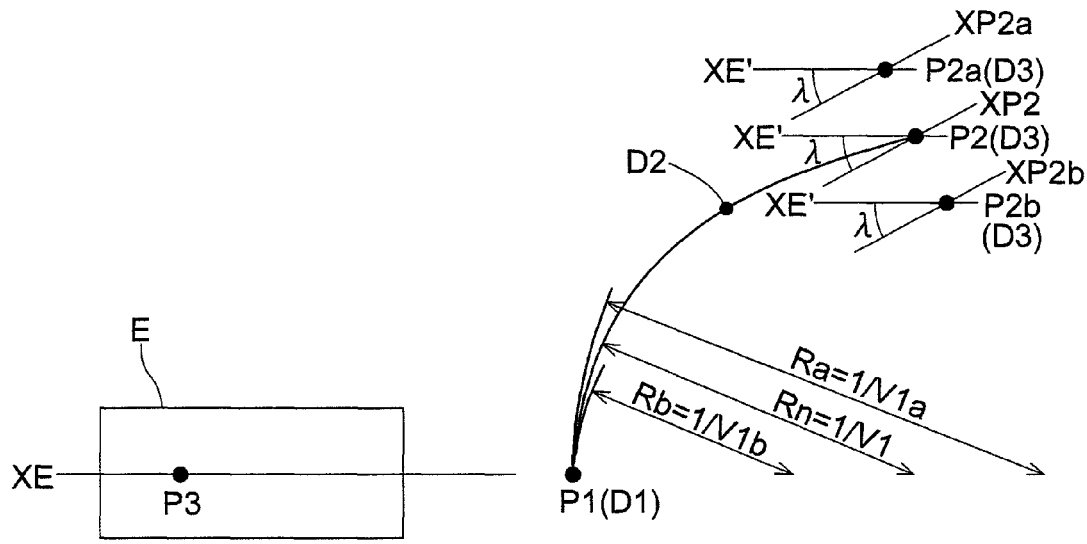
FIG. 16 a correlation diagram showing relationship between a reverse start position and a corrected reverse start position.

FIG. 16 shows the relationship between the reverse start position P2 and the corrected reverse start position P2a. In the figure, marks XE' denotes parallel displacements of the axis XE in the fore/aft direction of the parking target area E. If the curvature at the time of start of the forward correction is small, the turning radius Ra is large, so that the corrected reverse start position P2a is located on the outer side of the reverse start position P2. However, since the defection angle λ remains the same, the vehicle will be guided effectively to the parking target position P3 by the subsequent reverse guiding. Incidentally, for the purpose of simplifying the explanation, FIG. 16 shows the reverse start position P2 and the corrected reverse start position P2a being widely apart from each other. In actual situation, however, these positions are located with such proximity as they may be considered as substantially same positions.

Referring now back to FIG. 13, if it is determined at step #102 that the operational amount is greater than the predetermined operational amount C, the steering-back correcting control is executed (#103). This steering-back correcting control is effected until the operational amount of the steering wheel 4 reaches the predetermined operational amount C (#104). Thereafter, like the case of the steering-further correction control, the fixed steering ending timing is set again (#105).

Figure 15:
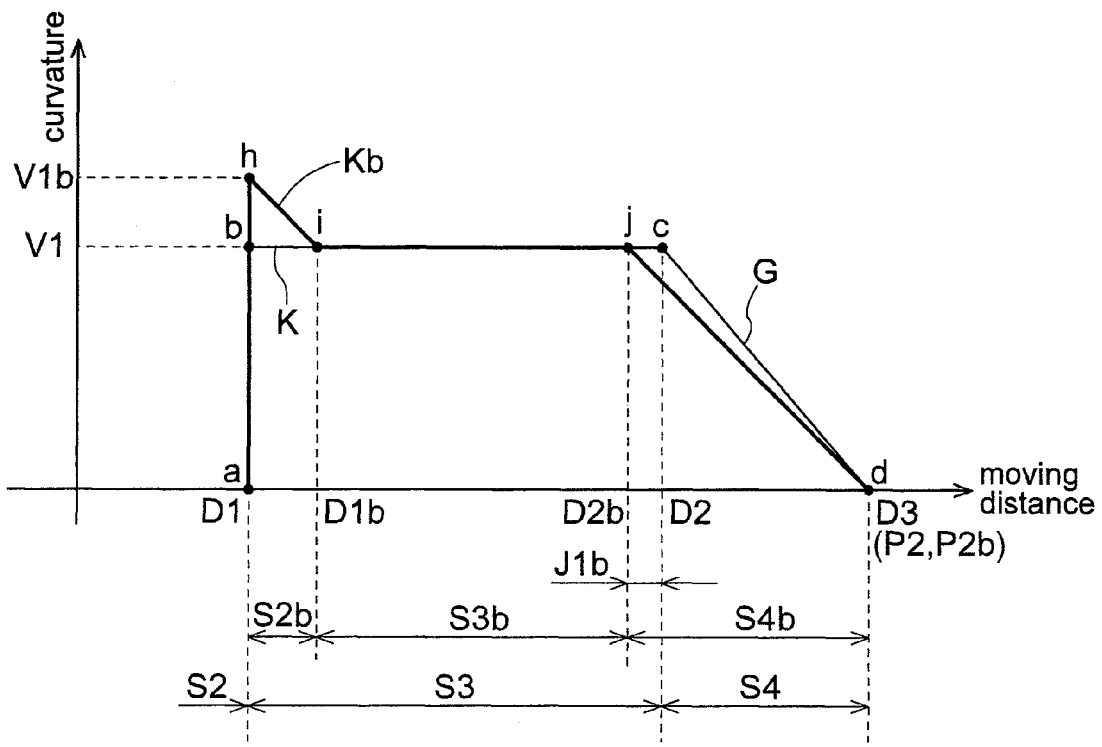
FIG. 15 a correlation diagram showing relationship between curvature and moving distance at the time of forward guiding in garage parking.

Referring now to FIG. 15, the above-described steering-back correction control will be described additionally. Like FIG. 14, FIG. 15 shows a correlation diagram between the curvature and the moving distance at the time of forward guiding in garage parking. The normal curvature transition K is same as in FIG. 14, therefore, description thereof will be omitted. In FIG. 15, comparison is made relative to the curvature transition Kb when the operational amount of the steering wheel 4 given prior to the forward guiding is greater than the predetermined operational amount C.

In case the operational amount of the steering wheel 4 is greater than the predetermined operational amount C, the curvature becomes a curvature V1b which is greater than the predetermined curvature V1 (point a→h, section S2). That is, in the section S2, the steering wheel 4 was operated to the point (h) beyond the point (b). Therefore, while the vehicle 1 is driven forward, the steering wheel 4 is steered back to return to the curvature V1 (point h→i, section S2b). In this returning, the steering-back operation is effected at the same rate as the rate of change of curvature at the time of the above-described steering-back control (#108). That is to say, the steering-back correcting control is effected with the same slope as the slope G at the time of the steering-back control. More particularly, the slope G at the time of steering-back control from point (c) to point (d) has a same value as the slope at the time of the steering-back correcting control from point (h) to point (i). From the view point of the operational amount of the steering wheel 4, the above means that the operational amounts per unit time are rendered equal to each other.

As shown, in the section S2b required for returning, the curvature changes with the transmission Kb differs from the normal transition K. In this case, as the curvature V1 was reached earlier, if the fixed steering were effected until the normal fixed steering ending timing, this would result in excess beyond the required turning. Therefore, the fixed steering section is shortened by a section J1b to the moving distance D2b (point j) before the moving distance D2 (point c). With this, the fixed steering section becomes the section S3b (point i→j). And, the steering-back control is effected from the moving distance D2b to the moving distance D3 (point j→d, section S4b). Since the moving distance D3 remains the same as that of the normal time, in correspondence with the amount of earliness of the start of the steering-back control, the rate of the curvature change at the time of steering-back control becomes smaller. Hence, at the moving distance D3, the vehicle 1 will be located at a corrected reverse start position P2b in the vicinity of the reverse start position P2. The positional relationship between the reverse start position P2 and the corrected reverse start position P2b will be discussed later.

The ending timing of the fixed steering control described above is determined by obtaining a particular point (j) with which agreement is established in areas between a triangle (bhi) and a triangle (cdj) in FIG. 15. With this, agreement is established between the normal curvature transition K and the curvature transition Kb at the time of correction (at the time of steering-back correction). That is, agreement is established between the area of a quadrangle (trapezoid) (abcd) and the area of the polygon (ahijd). With agreement of the total change amounts of deflection angle, agreement is established between the deflection angle λ at the reverse start position P2 and the deflection angle λ at the corrected reverse start position P2b.

Referring now back to FIG. 16, if the curvature at the time of start of the forward correction is large, the turning radius Rb is small, so that the corrected reverse start position P2b is located on the inner side of the reverse start position P2. However, since the defection angle λ remains the same, the vehicle will be guided effectively to the parking target position P3 by the subsequent reverse guiding. Incidentally, as described above, for the purpose of simplifying the explanation, FIG. 16 shows the reverse start position P2 and the corrected reverse start positions P2a and P2b being widely apart from each other. In actual situation, however, these positions are located with such proximity as they may be considered as substantially same positions. And, since the deflection angles λ are in agreement at these three points, the vehicle 1 will be guided effectively to the parking target position P3 by the subsequent reverse guiding.

During the forward guiding, the guiding section 29 can issue a guiding sound through the speaker 11. This can be an intermittent sound such as "peep, peep, peep . . . ", for example. When the vehicle 1 approaches the reverse start position P2 (including the corrected reverse start positions P2a, P2b), the interval between the intermittent sounds is made progressively shorter. And, when the vehicle 1 eventually reaches the reverse start position P2, the guiding section 29 outputs a continuous sound "Peeee", and causes the vehicle 1 to automatically stop. When the vehicle 1 is stopped, the output of the guiding sound is stopped.

Figure 5:
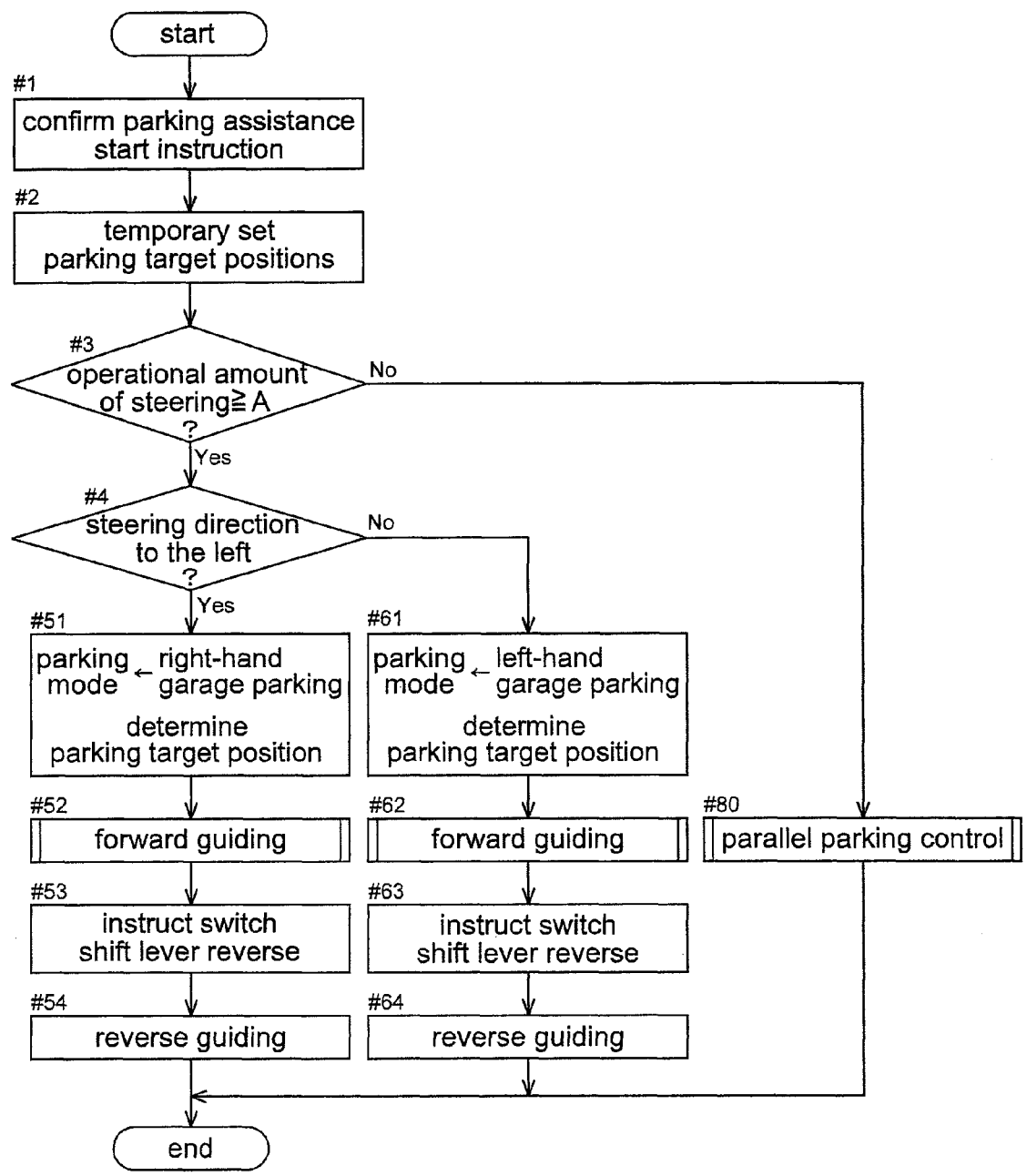
FIG. 5 a flowchart explaining a procedure of parking assistance by the parking assist system of the invention.
Figure 6:
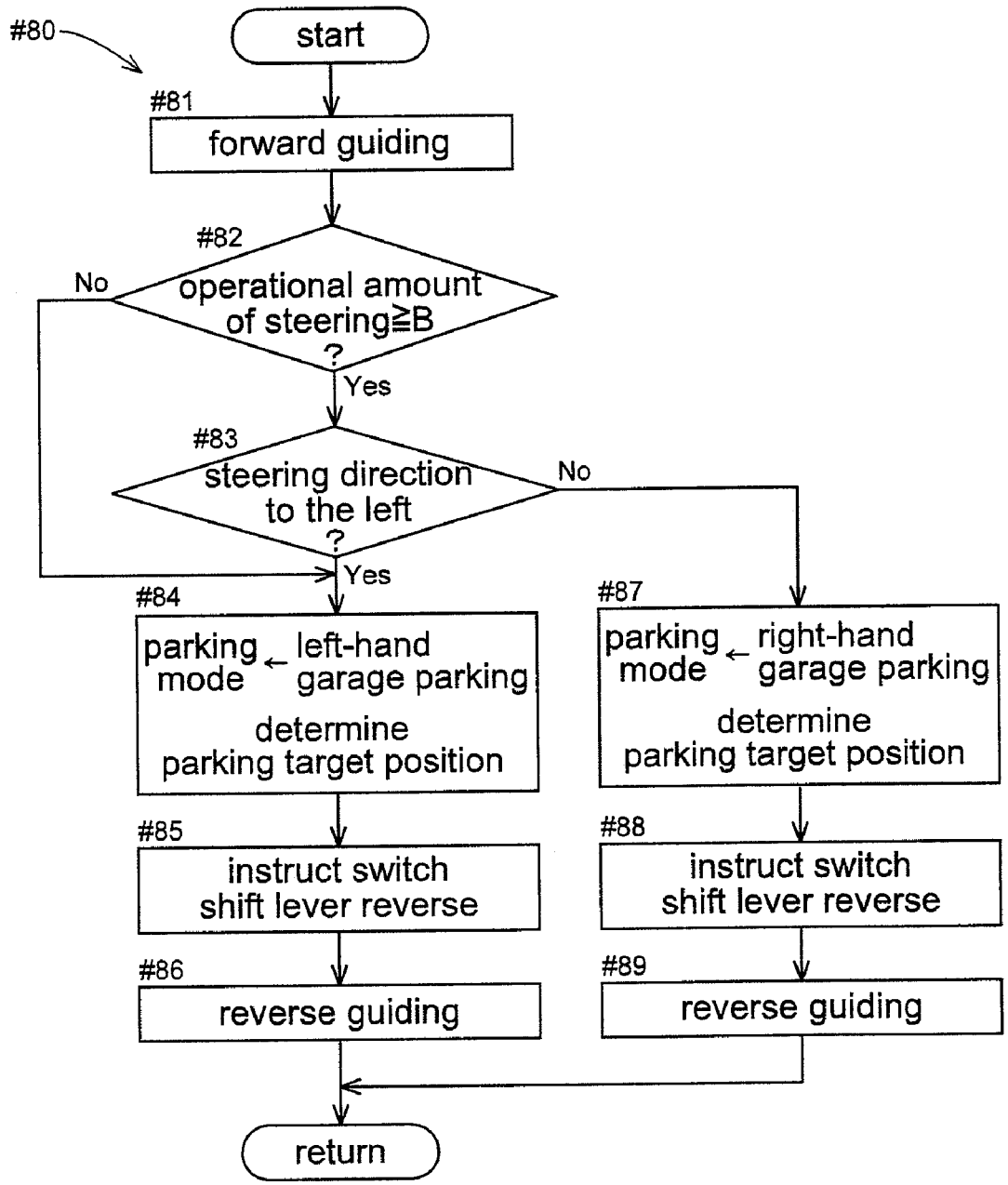
FIG. 6 a flowchart explaining a subroutine of parallel parking control shown in FIG. 5.

Next, the guiding section 29 informs, through the speaker 11, the driver to switch the shift lever 6 into reverse (FIG. 5, #53, #63). Upon switching of the shift lever 6 into reverse by the driver, the guiding section 29 starts reverse guiding of the vehicle to the parking target position P3 (#54, #64) Like the case of forward guiding, calculation is effected, with the provision of the reference point Q being in constant motion.

In this reverse guiding too, like the forward guiding described above, a guiding sound may be issued from the speaker 11. Like the forward guiding, this can be an intermittent sound such as "peep, peep, peep . . . ". When the vehicle 1 approaches the parking target position P3, the interval between the intermittent sounds is made progressively shorter. And, when the vehicle 1 eventually reaches the parking target position P3, the guiding section 29 outputs a continuous sound "Peeeep", and causes the vehicle 1 to automatically stop. When the vehicle 1 is stopped, the output of the guiding sound is stopped. The foregoing is the description of the procedure of parking assist in case the parking mode was determined as garage parking.

On the other hand, if it is determined at step #3 in FIG. 5 that the parking mode is parallel parking, forward guiding by straight traveling is effected (FIG. 6, #81) and the vehicle 1 is stopped in the vicinity of the reverse start position P2. Here, the parking mode determining section 25 prompts, through the speaker 11, the driver to operate the steering wheel 4. Specifically, in the case of the right-hand parallel parking, the driver will be informed by voice to operate the steering wheel 4 to the right. In the case of the left-hand parallel parking, the driver will be informed to operate the steering wheel 4 to the left. In this, the operational amount of the steering wheel 4 will be informed by voice at the same time as a quantitative numeric value. Since the curvature of the turn in the case of parallel parking is smaller, this operational amount is smaller than the operational amount for the garage parking prior to the forward guiding described hereinbefore.

The parking mode determining section 25 determines whether the operational amount of the steering wheel 4 exceeds a predetermined operational amount B or not (#82) and determines whether the parking mode is a left-hand parallel parking or not. Specifically, if the operational amount of the steering wheel 4 is blow the predetermined operational amount B, it is determined that the parking mode is the left-hand parallel parking which is the initial value (#84). Parallel parking is effected often on the road. So, in this case, with the assumption of use in a nation or an area where the left hand traffic is enforced, the left-hand parallel parking is set as the initial value. In the case of use in a nation or an area where the right hand traffic is enforced, the right-hand parallel parking will be set as the initial value, preferably.

On the other hand, if the operational amount of the steering wheel 4 is below the predetermined value B, based upon the steering direction, it is determined whether the parking is left-hand parallel parking or right-hand parallel parking (#83). If the operational direction of the steering wheel 4 is to the left, the parking mode determining section 25 determines the parking mode is left-hand parallel parking (#84), whereas, if the operational direction is to the right, the parking mode determining section 25 determines the parking mode is right-hand parallel parking (#87). The timing of this parking mode determination is basically upon lapse of a predetermined period after the vehicle 1 reaches the reverse start position P2. However, this timing may be determined at the time of the driver's operation of the shift lever 6 into reverse, without waiting for the lapse of such predetermined period.

Basically, after the determination of the parking mode, the guiding section 29 issues instruction to the driver via the speaker 11, to switch the shift lever 6 into reverse (#85, #88). Upon the driver's switching of the shift lever 6 into reverse, like the case of garage parking, the guiding section 29 starts reverse guiding of the vehicle to the parking target position P3 (#86, #89). The guiding section 29, as shown in FIG. 9, guides the vehicle 1 via the turning direction switching position P4 to the parking target position P3.

In case the parking mode is parallel parking, even at the point of arrival at the reverse start position P2, the parking target positions P3 are still under the temporarily set condition. Therefore, in the case of parallel parking, after the temporary setting of the parking target position P3, the predetermined stop position (or its vicinity) at which the parking mode is determined based upon the operation of the steering wheel 4 becomes the reverse start position P2. More particularly, the parking mode determining section 25 determines that the parking mode is a left-hand parallel parking, if the steering wheel is operated to the left by an amount greater than the predetermined operational amount B in the vicinity of the predetermined stop position (reverse start position P2). And, if the steering wheel is operated to the right by an amount greater than the predetermined operational amount, the parking mode is determined as right-hand parallel parking.

And, in the case of parallel parking, the guidance is made from the predetermined stop position (reverse start position P2) to the parking target position P3 along a guiding path including at least one turning-direction switching position (P4 in FIG. 9). This guiding path includes a reverse guiding path including a turn in a first turning direction from the predetermined stop position (reverse start position P2) to the switching position (P4) and a reverse guiding path including a turn in a second turning direction from the switching position (P4) to the parking target position P3.

As may be clear from the foregoing description, the radius of the turn in the first turning direction during the reverse guiding is affected by the steering amount of the steering wheel 4 given at the time of determination of the parking mode. However, like the foregoing case of the garage parking, according to the present embodiment, regardless of the operational amount of the steering wheel 4, the vehicle 1 is guided such that the deflection angle of the vehicle 1 relative to the parking target position P3 may be a predetermined deflection angle λ, in the vicinity of the switching position (P4). The guidance including this correction should be apparent for those skilled in the art from the foregoing embodiment relating to the garage parking. Therefore, detailed discussion thereof will be omitted.

OTHER EMBODIMENTS

Figure 17:
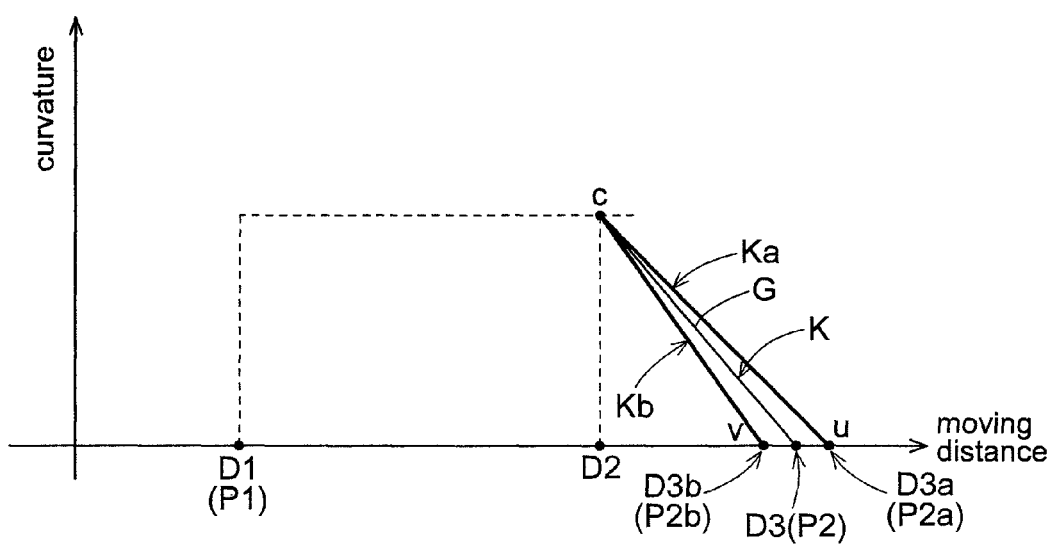
FIG. 17 a correlation diagram showing further relationship between curvature and moving distance at the time of forward guiding in garage parking.

In the foregoing embodiment, since the steering angle correction is effected at the time of start of the fixed steering section S3, there are provided the section J1a for extending the fixed steering or the section J1b for shortening the fixed steering, before/after the ending of the fixed steering section S3 (at the time of moving distance D2). However, the invention may be embodied, without providing such extending section J1a or the shortening section J1b, but the length of the section for effecting the steering-back control may be adjusted, upon ending of the fixed steering section S3. For instance, as shown in FIG. 17, in case the initial curvature was small, the section for effecting the steering-back control may be extended, whereas, in case the initial curvature was large, the section for effecting the steering-back control may be shortened.

As described above, according to the present invention, it is possible to provide a parking assist system capable of guiding a vehicle to a predetermined position irrespectively of a steering amount given prior to movement of the vehicle when the vehicle is guided with turning to the predetermined position under control of automatic steering, with the given steering amount.

INDUSTRIAL APPLICABILITY

The present invention is applicable to a parking assist system for assisting a driving operation for parking a vehicle.

The invention claimed is:

1. A parking assist system for assisting parking of a vehicle, comprising:
   a parking target position setting section configured for temporarily setting, at a predetermined stop position, a parking target position for the vehicle for each one of a plurality of parking modes;
   a parking mode determining section configured for determining, after the setting of the parking target position and based upon an amount of steering operation effected by a driver, a parking mode and the parking target position corresponding to the parking mode;
   a guiding section configured for guiding, by automatic steering control, the vehicle from the predetermined stop position to the parking target position along a guiding path including at least one turning-direction switching position; and
   a correcting section configured for effecting such a correction that a deflection angle of the vehicle relative to the parking target position is corrected to a predetermined deflection angle at a corrected turning-direction switching position nearby said turning-direction switching position, regardless of the amount of steering operation effected prior to determination of the parking mode, the correcting section causing said guiding section to guide the vehicle to the parking target position, with the correction.

2. The parking assist system according to claim 1, wherein said correcting section causes said guiding section to guide the vehicle, with said corrected turning-direction switching position being a position of a same moving distance from the predetermined stop position as a moving distance from the predetermined stop portion to the turning-direction switching position.

3. The parking assist system according to claim 1, wherein said guiding section effects a fixed steering control for guiding the vehicle with fixing the steering to a predetermined steering amount and a steering-back control for returning the steering amount to a neutral position at said turning-direction switching position; and when the amount of steering operation provided at the time of determination of the parking mode does not agree to said predetermined steering amount, said correcting section effects a correcting control for either increasing or decreasing the amount of steering operation in the course of guidance from said predetermined stop position to the turning-direction switching position, so as to render the steering amount equal to the predetermined steering amount.

4. The parking assist system according to claim 3, wherein said correcting control is effected prior to said fixed steering control.

5. The parking assist system according to claim 4, wherein after said fixed steering control, the steering-back control for returning the steering amount to a neutral position at said turning-direction switching position is effected.

6. The parking assist system according to claim 3, wherein the steering amount per unit time in said correcting control is substantially equal to the steering amount per unit time in the steering-back control to the initial turning-direction switching position prior to the correction.

7. The parking assist system according to claim 1, wherein said parking mode determining section determines that the parking mode is a right-hand or left-hand garage parking if the steering was operated to the left or the right by an amount equal to or greater than a predetermined amount in the vicinity of the predetermined stop position; and said guiding path includes a forward guiding path including a turn in a first turning direction from said predetermined stop position to said switching position and a reverse guiding path including a turn in a second turning direction from said switching position to said parking target position.

8. The parking assist system according to claim 2, wherein said guiding section effects a fixed steering control for guiding the vehicle with fixing the steering to a predetermined steering amount and a steering-back control for returning the steering amount to a neutral position at said turning-direction switching position; and when the amount of steering operation provided at the time of determination of the parking mode does not agree to said predetermined steering amount, said correcting section effects a correcting control for either increasing or decreasing the amount of steering operation in the course of guidance from said predetermined stop position to the turning-direction switching position, so as to render the steering amount equal to the predetermined steering amount.

9. The parking assist system according to claim 8, wherein said correcting control is effected prior to said fixed steering control.

10. The parking assist system according to claim 9, wherein after said fixed steering control, the steering-back control for returning the steering amount to a neutral position at said turning-direction switching position is effected.

11. The parking assist system according to claim 4, wherein the steering amount per unit time in said correcting control is substantially equal to the steering amount per unit time in the steering-back control to the initial turning-direction switching position prior to the correction.

12. The parking assist system according to claim 5, wherein the steering amount per unit time in said correcting control is substantially equal to the steering amount per unit time in the steering-back control to the initial turning-direction switching position prior to the correction.

13. The parking assist system according to claim 8 wherein the steering amount per unit time in said correcting control is substantially equal to the steering amount per unit time in the steering-back control to the initial turning-direction switching position prior to the correction.

14. The parking assist system according to claim 9, wherein the steering amount per unit time in said correcting control is substantially equal to the steering amount per unit time in the steering-back control to the initial turning-direction switching position prior to the correction.

15. The parking assist system according to claim 10, wherein the steering amount per unit time in said correcting control is substantially equal to the steering amount per unit time in the steering-back control to the initial turning-direction switching position prior to the correction.

16. The parking assist system according to claim 2, wherein said parking mode determining section determines that the parking mode is a right-hand or left-hand garage parking if the steering was operated to the left or the right by an amount equal to or greater than a predetermined amount in the vicinity of the predetermined stop position; and said guiding path includes a forward guiding path including a turn in a first turning direction from said predetermined stop position to said switching position and a reverse guiding path including a turn in a second turning direction from said switching position to said parking target position.

17. The parking assist system according to claim 3, wherein said parking mode determining section determines that the parking mode is a right-hand or left-hand garage parking if the steering was operated to the left or the right by an amount equal to or greater than a predetermined amount in the vicinity of the predetermined stop position; and said guiding path includes a forward guiding path including a turn in a first turning direction from said predetermined stop position to said switching position and a reverse guiding path including a turn in a second turning direction from said switching position to said parking target position.

18. The parking assist system according to claim 8, wherein said parking mode determining section determines that the parking mode is a right-hand or left-hand garage parking if the steering was operated to the left or the right by an amount equal to or greater than a predetermined amount in the vicinity of the predetermined stop position; and said guiding path includes a forward guiding path including a turn in a first turning direction from said predetermined stop position to said switching position and a reverse guiding path including a turn in a second turning direction from said switching position to said parking target position.

* * * * *